United States Patent
Rowlette et al.

(10) Patent No.: US 6,450,409 B1
(45) Date of Patent: Sep. 17, 2002

(54) METHOD AND APPARATUS FOR WIRING ROOM THERMOSTAT TO TWO STAGE HVAC SYSTEM

(75) Inventors: Mitchell R. Rowlette, Berea, KY (US); Walter H. Bailey, Johnson City, TN (US); Mark E. Miller, Versailles, KY (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/714,029

(22) Filed: Nov. 15, 2000

Related U.S. Application Data

(60) Provisional application No. 60/197,114, filed on Apr. 14, 2000.

(51) Int. Cl.[7] .............................................. G05D 23/00
(52) U.S. Cl. ......................... 236/1 E; 165/261; 62/175
(58) Field of Search ........................... 62/175, 77, 298, 62/179, 180, 182; 236/1 E, 78 D, 1 C; 165/260, 261, 262, 256

(56) References Cited

U.S. PATENT DOCUMENTS

| | | | | |
|---|---|---|---|---|
| 5,022,460 A | * | 6/1991 | Brown ....................... | 165/262 |
| 5,572,104 A | | 11/1996 | Nold et al. .................. | 318/672 |
| 5,806,760 A | * | 9/1998 | Maiello ................... | 165/206 X |
| 6,230,979 B1 | * | 5/2001 | Vendt et al. ............. | 236/1 E X |
| 6,244,515 B1 | * | 6/2001 | Rowlette et al. ............ | 236/1 E |

OTHER PUBLICATIONS

Copending Application Ser. No. 09/563,081 filed May 1, 2000 in which this application claims benefit of 60/172,876 filed Dec. 20, 1999 (Attorney Docket No. A41397) entitled "Method and Apparatus using Phases for Communication in Thermostat Circuit".

* cited by examiner

*Primary Examiner*—Harry B. Tanner
(74) *Attorney, Agent, or Firm*—Russell E. Baumann; Frederick J. Telecky, Jr.

(57) ABSTRACT

A control used in a two stage HVAC system has a power supply from a 24 VAC transformer which is full wave rectified (D1, D2, D3, D4) to create DC voltages for a microcontroller (U1) and relays (K1–K3). All of the control information needed for the two stage control system is sent to the control from a room thermostat (12) having first and second stage cooling signal terminals (Y1, Y2) over a single line by connecting a diode between the Y1, Y2 terminals creating separate microprocessor recognizable signals.

7 Claims, 4 Drawing Sheets

METHOD AND APPARATUS FOR WIRING ROOM THERMOSTAT TO TWO STAGE HVAC SYSTEM

CROSS REFERENCED APPLICATIONS

This application claims priority under 35 USC Section 119 (e) (1) of provisional application No. 60/197,114 filed Apr. 14, 2000.

U.S. provisional application No. 60/172,876, assigned to the assignee of the present invention, contains similar subject matter.

FIELD OF THE INVENTION

This invention relates generally to heating, ventilating and air conditioning (HVAC) systems and more particularly to two stage systems having reduced wiring between a room thermostat and the system control.

BACKGROUND OF THE INVENTION

The use of staged HVAC equipment is ever increasing. A typical two stage system has a low and a high mode of heat transfer. For example, two stage gas furnaces have allowed the use of low and high combustion for many years. Two stage systems have advantages over the typical single stage system. Firstly, greater comfort is allowed. By allowing a lower heat transfer mode when the heat load is lower in the home, the temperature essentially will not swing beyond the desired set point in contrast to a single stage system. Furthermore, during the low transfer mode the system is more likely to run longer which helps to eliminate stagnant air conditions. Secondly, greater efficiency is obtained by using a low transfer mode. That is, less energy is consumed since the need for the high transfer mode only occurs for a small percentage of the time.

Technology has changed in recent years to more readily allow the use of two stage systems. For example, the expanding use of electronics has allowed two stage gas furnaces to be less costly. The creation of two stage compressors has brought about the two stage heat pump and air conditioning. However, each of these systems requires the use of a two stage room thermostat to accomplish the full benefit of the two stage heat transfer system. These two stage thermostats require the use of a second control wire to the heating/cooling equipment. This presents a major problem when the two stage system is being used to replace an existing single stage system. The procedure for adding another control wire to the room thermostat involves tearing open the walls and ceiling of the home. This is a major cost adder and inconvenience in the replacement market and can serve as a reason for not upgrading the existing equipment. This is particularly onerous since higher efficiency and greater comfort systems dominate the replacement market.

SUMMARY OF THE INVENTION

It is an object of the present invention to provide a method and apparatus to overcome the limitations of the prior art described above. Another object of the invention is the provision of a method and apparatus for wiring room thermostats to two stage HVAC system controls which are inexpensive and simple yet reliable and which are particularly suitable for the replacement market.

Briefly, in accordance with the invention, a single control wire, such as an existing control wire to a room thermostat, can be used to select both the high and low heat transfer modes of operation of a two stage HVAC system. According to the invention, the control to be used in a two stage system has a power supply from a transformer, such as a 24 VAC transformer. This voltage is full wave rectified to create DC voltages for the control's microcontroller and relays. The microcontroller based control determines if an input is "ON" or "OFF" by looking at the phase relationships of the control signal. Additional information is provided on the single control wire by placing a diode in series with the signal. The diode is added to create a distinct signal recognizable by the microcontroller. Thus, by transferring the descriptions from "ON" to "High Heat Transfer" and "Diode in Series" to "Low Heat Transfer" all of the control information needed for the two stage control system can be sent to the control system.

BRIEF DESCRIPTION OF THE DRAWINGS

Other objects, advantages and details of the novel method and apparatus of the invention appear in the following detailed description of the preferred embodiments of the invention, the detailed description referring to the drawings in which.

DETAILED DESCRIPTION OF THE PREFERRED EMBODIMENT

Figure 1A:
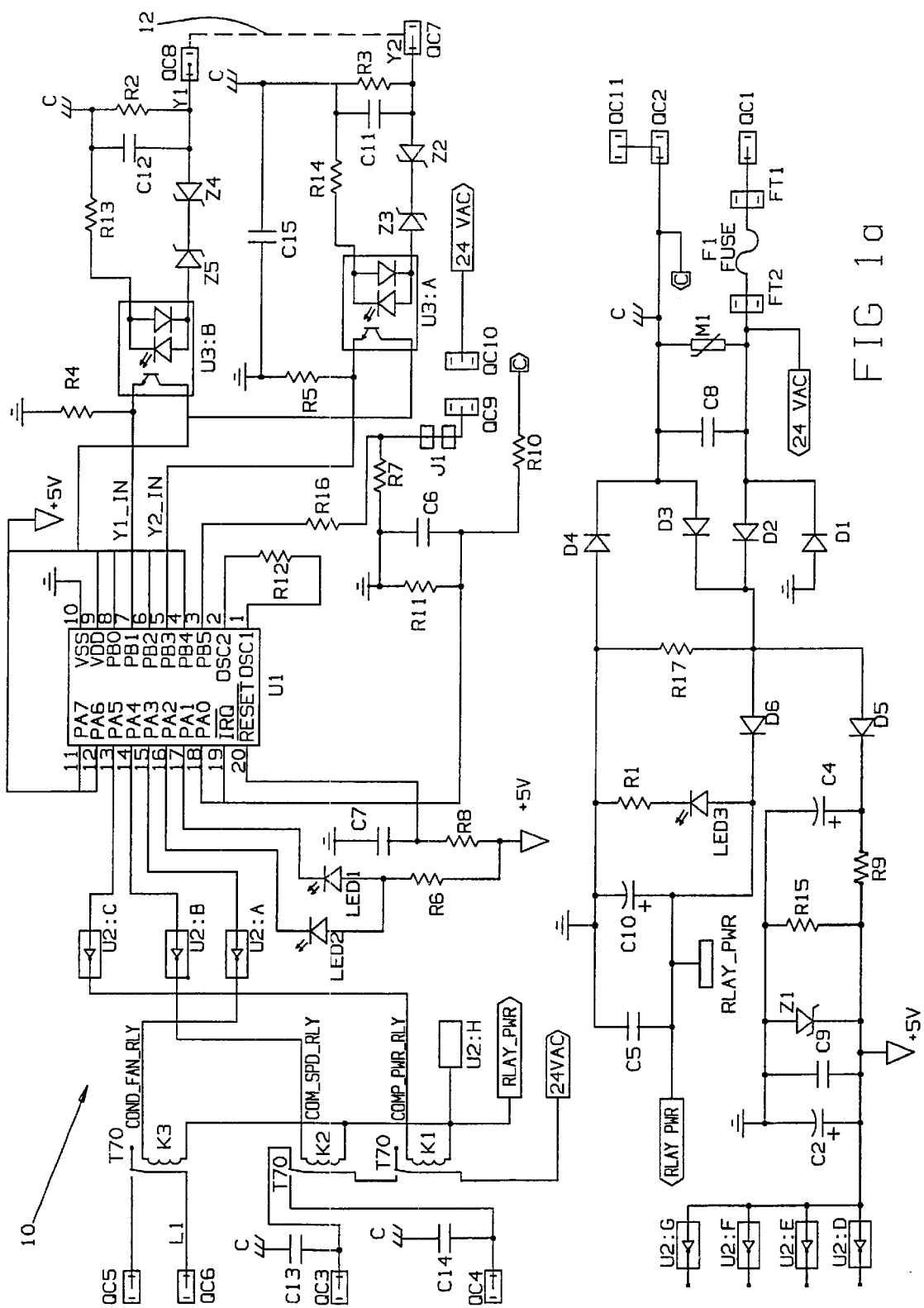
FIGS. 1a–1c taken together constitute a schematic of a control for use with a two stage cooling system with which the invention is used.
Figure 1B:
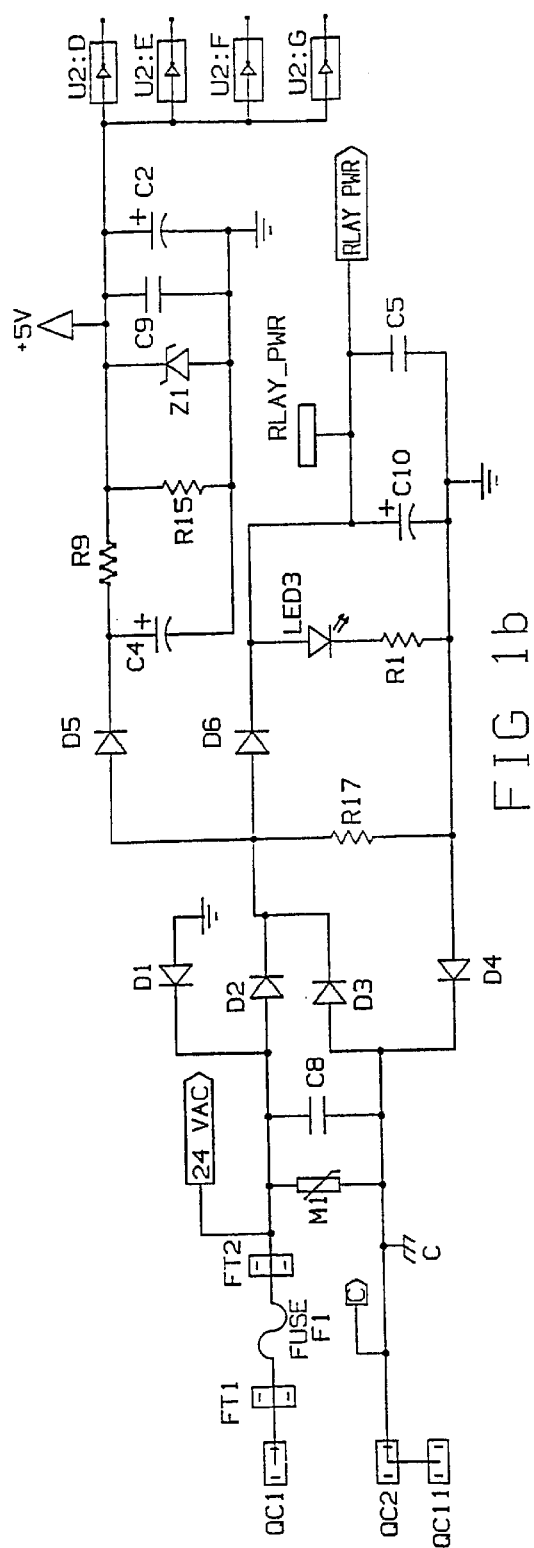
Figure 1C:
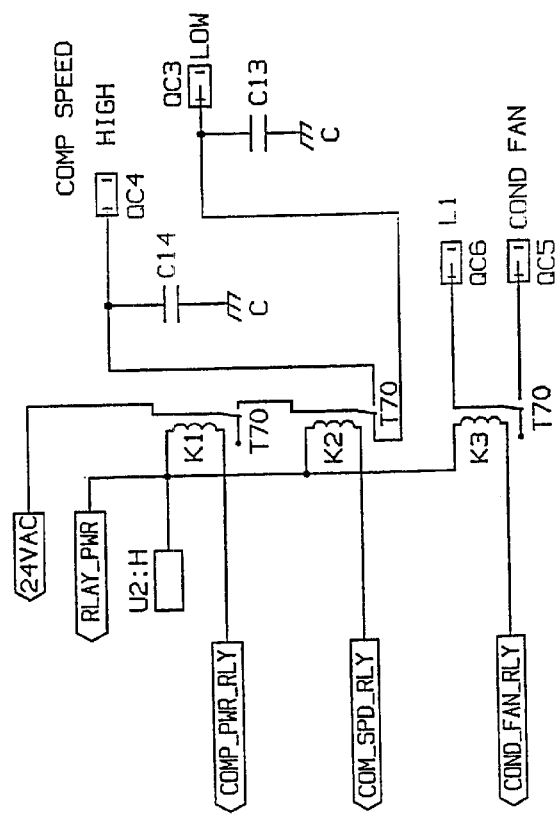

Referring to FIGS. 1a–1c, operation of the preferred embodiment of the invention will be described. As shown in FIG. 1b, power (24 VAC) is applied to the logic circuitry through three ¼ inch male quick connects QC1 (signal 24 VAC) and QC2 and QC11 (signal C or earth ground). Fuse F1 is a 3 amp automotive style (ATO) and is attached to fuse terminals FT1 and FT2 serially connected to the 24 VAC power. Fuse F1 protects the circuitry of the control by limiting the current to the device. Capacitor C8 and metal oxide varistor M1 act as a noise filter for the 24 VAC power. Fuse F1 is connected to the signal 24 VAC and the anode of diode D2 and the cathode of diode D1. The anode of diode D3 and the cathode of diode D4 are connected to the C signal. These four diodes rectify the 24 VAC power to a DC power source 24_RECT (cathodes of D2 and D3) and GND (anodes of D4 and D1). This is the power source for all the electronics of the control. The anode of diode D6 is also connected to the signal 24_RECT. The cathode of diode D6 is connected to signal RLAY_PWR. Capacitors C10 and C5 are connected between signal RLAY_PWR and GND. These capacitors act to filter noise from the RLAY_PWR signal and to limit voltage change when loads are energized on RLAY_PWR. Signal RLAY_PWR is the power source for all the relays of the assembly (K1–K3). The anode of light emitting diode LED3 is connected RLAY_PWR and the cathode of light emitting diode LED3 is serially connected to resistor R1. The other side of resistor R1 is attached to GND. This causes light emitting diode LED3 to be illuminated when power is applied to the control. The anode of diode D5 is connected to 24_RECT and the cathode is connected to 24LOGIC. Diode D5 acts to isolate filter capacitor C4 (attached to 24LOGIC and GND) from RLAY_PWR. Capacitor C4 filters the rectified DC power. One side of resistor R9 is attached to 24LOGIC while the other side of the resistor is connected to the cathode of zener diode Z1. The anode of zener Z1 is connected to GND. Resistor R15 is connected across the zener Z1 to discharge capacitor C4 during power interruption. Resistor R9 limits current flow to the zener diode while the zener regulates 24LOGIC to five volts DC (VDD). Capacitors C9 and C2 act to filter the five volt DC power. Resistor R15 also discharges capacitors C9 and C2 during power interruption.

Signal VDD supplies power to all the logic circuitry (U1 pin 9, FIG. 1a). With reference to FIG. 1a, the oscillator for the microcontroller U1 comprises resistor R12 and the internal oscillator circuitry of the microcontroller. Pins 1 and 2 of microcontroller U1 are connected to respective opposite sides of resistor R12. Resistor R12 sets the frequency of operation of the microcontroller (typically 2.73 MHz). Signal +5V is connected to resistor R8. The other side of resistor R8 is attached to pin 20 (RESET') and one side of capacitor C7. The second pin of capacitor C7 is connected to GND. This RC circuit maintains the RESET' signal at a low logic level until +5V power has stabilized after a power cycle.

Resistor R10 is connected to C and the interrupt pin of the microcontroller U1 pin 19 (signal IRQ'). Capacitor C6 is connected between IRQ' and GND and acts to filter the IRQ' signal. IRQ' is also connected to U1 pin 18 to utilize the internal protection diodes on this pin to protect the microcontroller from excessive voltage. Resistor R11 is also connected across capacitor C6 and acts to discharge capacitor C6 during power interruption. Signal IRQ' is a 5 volt DC, 60 Hz square wave (with 60 Hz, 24 VAC applied to the control). This signal forms the time base for all operations of the microcontroller.

Signal Y1 is generated by the room thermostat when the temperature rises one degree above the set point. Signal Y1 is input to the control via quick connect QC8. Signal Y1 is connected to one side of resistor R2. The other side of resistor R2 is connected to C (or Common). Capacitor Cl2 is connected in parallel across resistor R2 to filter noise signals from signal Y1. Signal Y1 is connected to the anode of zener Z4. The cathode of zener Z4 is serially connected to the cathode of zener Z5, while the anode of zener Z5 is attached to the input diodes of U3B, an opto-isolator. The other side of the input diodes is connected to resistor R13, in turn connected to common (signal C). This network created by zeners Z4, Z5, the input diodes of opto-isolator U3B, and resistor R13 forms a voltage discriminator network such that opto-isolator U3B will not be energized unless signal Y1 is above 12 volts AC. The output portion of opto-isolator U3B consists of an isolated transistor. The transistor's collector is connected to +5V. The emitter of the transistor is connected to signal Y1_IN (pin 7 of U1). Resistor R4 is placed between Y1_IN and GND to act as a pull-down. In this configuration Y1_IN will be energized at a 120 Hz rate whenever an AC signal is applied to Y1 with respect to C (common). The opto-isolator allows the micro-controller to detect the frequency and phase of the incoming signal regardless of its source.

Signal Y2 is generated by the room thermostat when the temperature rises typically three to five degrees above the set point. Signal Y2 is input to the control via quick connect QC7. Y2 is connected to resistor R3 with the other side of resistor R3 connected to C (or Common). Capacitor C11 is connected in parallel across resistor R3 to filter noise signals from signal Y2. Signal Y2 is connected to the anode of zener Z2. The cathode of zener Z2 is serially connected to the cathode of zener Z3, while the anode of zener Z3 is attached to the input diodes of opto-isolator U3A. The other side of the input diodes is connected to resistor R14, in turn connected to common. This network created by zeners Z2, Z3, the input diodes of opto-isolator U3A, and resistor R14 forms a voltage discriminator network such that opto-isolator U3A will not be energized unless signal Y2 is above 12 volts AC. The output portion of opto-isolator U3A consists of an isolated transistor. The transistor's collector is connected to +5V. The emitter of the transistor is connected to signal Y2_IN (pin 5 of U1). Resistor R5 is placed between Y2_IN and GND to act as a pull-down. In this configuration Y2_IN will be energized at a 120 Hz rate whenever an AC signal is applied to Y2 with respect to C (common). The opto-isolator allows the micro-controller to detect the frequency and phase of the incoming signal regardless of its source.

QC10 and QC9 act as a "TEST" input to the microcontroller. QC10 is connected to 24 VAC. QC9 is attached to resistor R7 with the other pin of resistor R7 applied to GND. QC9 is also attached to resistor R16 with the other side of resistor R16 applied to pin 3 of microcontroller U1, signal TEST_IN. When a short is placed across QC10 and QC9, the microcontroller can detect the presence of the short. The s/w in the microcontroller will reset all time delays when this occurs. Thus, an installer or service person may circumvent the antishort cycle delays with this input.

Pin 15 of microcontroller U1 (signal COND_FAN) is connected to relay driver U2A. The output of U2A is connected to one side of the K3 relay coil (see FIG. 1c). The other side of the K3 relay coil is connected to RLAY_PWR. The common terminal K3 is connected to L1, the 240 VAC source (quick connect QC6). The normally open terminal of relay K3 is connected to quick connect QC5. This is attached in the system to the condenser fan motor, which circulates air over the condenser coils. Thus microcontroller U1 is able to control the COND_FAN (condenser fan motor) of the air conditioner.

Pin 13 of microcontroller U1 (signal COMP_PW) is connected to relay driver U2C. The output of U2C is connected to one side of the K1 relay coil (see FIG. 1c). The other side of the K1 relay coil is connected to RLAY_PWR. The common terminal of relay K1 is connected to the 24 VAC source. The normally open terminal of relay K1 is also connected to the common terminal of relay K2. This allows 24 VAC to be connected to relay K2 when relay K1 is energized. Pin 14 of microcontroller U1 (signal COMP_SPD) is connected to relay driver U2B. The output of relay driver U2B is connected to one side of the K2 relay coil (FIG. 1c). The other side of the K2 relay coil is connected to RLAY_PWR.

The normally open terminal of relay K2 is connected to QC4 (signal HIGH). The normally closed contact of relay K2 if connected to QC3 (signal LOW). The signals HIGH and LOW are connected to the coils of two contactors in the system, which energize the forward or reverse rotation direction of a two stage compressor. Thus, microcontroller U1 is able to control the two stage compressor and the rotation that the motor operates through energizing relay K1 and (or) relay K2. The other sides of the contactor coils are attached to Common (signal C). Capacitors C13 and C14 are placed across the respective output signals LOW and HIGH to suppress electrical noise.

The pin of U2:H is the common terminal for the suppression diodes internal to the relay driver. And is connected to RLAY_PWR to insure that electrical transient voltage spikes (also known as back electromotive force) will be suppressed when each relay is de-energized by the microcontroller U1.

Pin 16 of microcontroller U1 (signal HI_LED_DRV) is connected to the cathode of the light emitting diode LED2. The anode of diode LED2 is connected to resistor R6 (and the anode of diode LED1), while the other side of resistor R6 is attached to VDD. Resistor R6 limits current flow through the light emitting diode. This enables microcontroller U1 to control diode LED2 to indicate when the control is operating in HIGH (capacity) mode. Pin 17 of microcontroller U1 (signal LOW_LED_DRV) is connected to the cathode of the light emitting diode LED1. The anode of diode LED1 is connected to resistor R6 (and the anode of LED2), while the other side of resistor R6 is attached to VDD. Resistor R6 limits current flow through the light emitting diode. This enables microcontroller U1 to control diode LED1 to indicate when the control is operating in LOW (capacity) mode.

Figure 2:
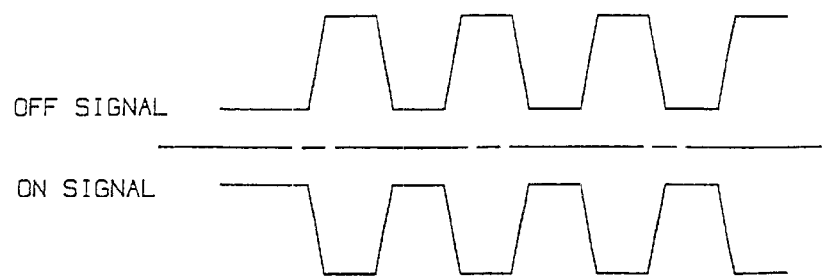
FIG. 2 shows typical "ON" and "OFF" signals.
Figure 3:
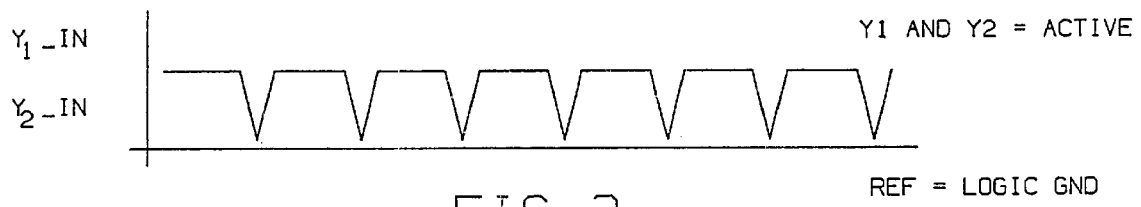
FIGS. 3–5 show a single wire operating mode with Y1 and Y2 active, Y1 only active and Y1 and Y2 off, respectively.
Figure 6:
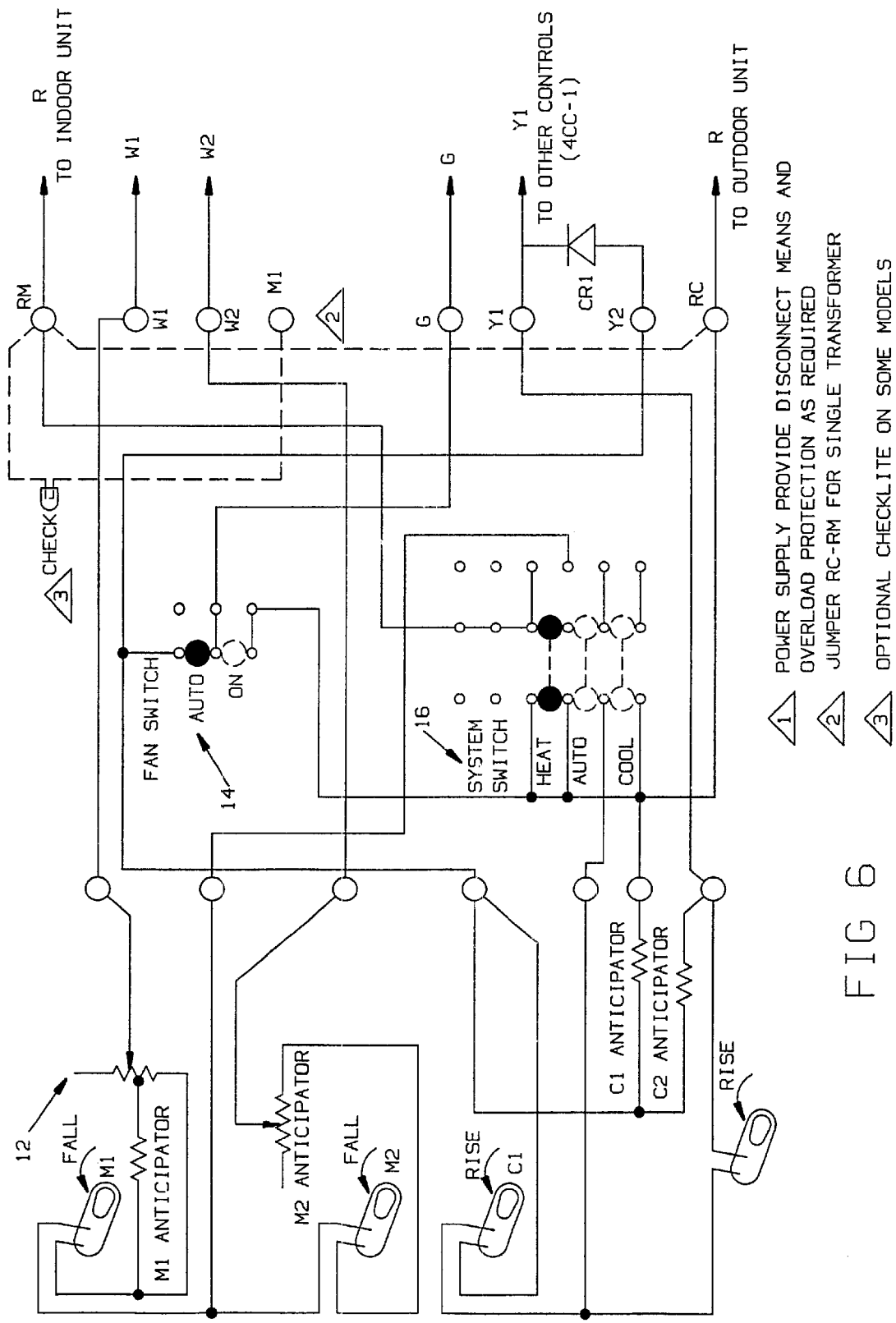
FIG. 6 is a schematic diagram of a typical two stage room thermostat shown with the Y1 signal line connected to the Y2 signal line through a diode in accordance with the invention.

As described in U.S. Pat. No. 5,572,104, assigned to the assignee of the present invention, the subject matter of which is included herein by this reference, the microcontroller based control determines if an input is "ON" or "OFF" by looking at the phase relationships of the control signal. Typical "ON" and "OFF" signals are shown in FIG. 2. The addition of information to this signal can be accomplished by placing a diode in series with the signal, the resulting signal shown in FIG. 3. It will be seen that these signal conditions "OFF", "ON" and "Diode in Series" are very different from one another and can be easily detected by the microcontroller. Thus by transferring the descriptions from "ON" to "High Heat Transfer" and "Diode in Series" to "Low Heat Transfer" all of the information needed for a two stage control can be sent to the control system. FIG. 6 shows the schematic diagram of a typical two stage room thermostat 12 shown with the addition of a diode CR1. The anode of this diode is connected to signal line Y1 and the cathode is connected to signal line Y2. Room thermostat 12 includes a fan switch 14 and system switch 16 interconnected with heat anticipators H1, H2 and cool anticipators C1, C2. RH and RC terminals are for connection to an indoor and outdoor unit, respectively. Terminals W1 and W2 are for connection to first and second heat stages, respectively. Y1 and Y2 terminals are for connection with first and second cool stages.

When diode CR1 is connected to the control as shown and described, a fully operational two stage system is realized without any wires being added to the system. Thus the problem of the need to augment the wiring in a replacement system is eliminated with an additional cost to the system of less than ten cents. It will be appreciated that signal lines W1 and W2 can be interconnected in like manner by adding therebetween another diode.

The operation of the preferred embodiment follows. Referring to FIGS. 1a through 1c, a schematic representation of the control is given. This control has two main purposes. The first purpose is to reduce the number of wires required to operate and control a two stage air conditioning condenser unit. Opto-isolators U3A and U3B allow the control in the condenser unit to be powered from a separate 24 VAC power source (inside the condenser unit) from the indoor fan control 24 VAC power supply. This is very important if the condenser unit is to be used as a replacement for an existing outdoor unit because the control is insensitive to the phase relationships between the two power supplies. The second purpose (or mode of operation) is to operate with two stage room thermostats which have additional wiring available. These modes of operation are described below. Thus the control can universally control two stage condenser units.

Figure 4:
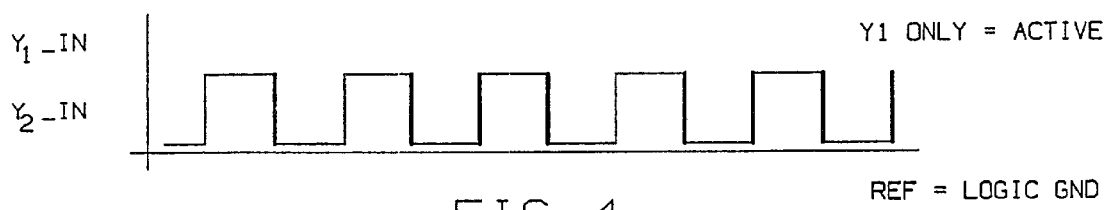
Figure 5:

In one mode, QC7 (signal Y2) and QC8 (signal Y1) are shorted together via a wire lead attached to the control (see dashed line 10 in FIG. 1a). This point then is connected to the Y1 signal from the room thermostat as shown in FIG. 4. In this mode, only one control wire is available from the room thermostat to the condensing unit. When the room thermostat calls for first stage of cooling, diode CR1 in the room thermostat half wave rectifies the signal from the room thermostat. The microcontroller U1 via inputs, Y1_IN (pin 7) and Y2_IN (pin 5) then detects this half wave signal. When the microcontroller detects this condition, the condenser fan is energized (through relay K3) and the LOW capacity of operation is selected (by de-energizing relay K2). Then relay K1 is energized to power the low capacity contactor, which will apply the power to the compressor in a manner to select proper shaft rotation sense for low capacity operation. Notably, the proper capacity is selected (via relay K2) before the contactors are powered (via relay K1).

If the room thermostat calls for two stages of cooling (high capacity) a full wave AC signal will be applied to the Y1 terminal of the control. This in turn, causes a full wave rectified signal (through optos U3A and U3B) to be applied to the microcontroller U1 at signals Y1_IN and Y2_IN. If the microcontroller detects this condition, the condenser fan is energized (through relay K3) and the HIGH capacity of operation is selected (by energizing relay K2). Then relay K1 is energized to power the high capacity contactor, which will apply the power to the compressor in a manner to select proper shaft rotation sense for high capacity operation. Notably, if the compressor has been operating in LOW capacity the microcontroller will delay energizing relay K1 to allow the pressure to equalize in the refrigerant system. This insures that the compressor will not attempt to start against a high pressure condition.

In the other mode of operation, QC7 (signal Y2) and QC8 (signal Y1) are not shorted together. In this mode, the control is intended to be used with a standard two stage room thermostat with separate control wires for first and second stage of operation, i.e., without diode CR1. If the room thermostat calls for the first stage (LOW capacity) of cooling, a signal will only appear on Y1. If the room thermostat calls for two stages of cooling (HIGH capacity), then both Y1 and Y2 will be energized. Since only one signal will be energized for first stage cooling, the microcontroller can accommodate mis-wire conditions on Y1 and Y2 by sensing the presence of only one signal at Y1_IN and Y2_IN. When the microcontroller detects this condition, the condenser fan is energized (through relay K3) and the low capacity of operation is selected (by de-energizing relay K2). Then relay K1 is energized to power the low capacity contactor, which will apply the power to the compressor selecting the proper shaft rotation sense (direction) for low capacity operation.

If the room thermostat calls for two stages of cooling (high capacity) a full wave AC signal will be applied to the Y1 terminal of the control. This in turn, causes a full wave rectified signal (through optos U3A and U3B) to be applied to microcontroller U1 at signals Y1_IN and Y2_IN. If the microcontroller detects this condition, the condenser fan is energized (through relay K3) and the HIGH capacity of operation is selected (by energizing relay K2). Then relay K1 is energized to power the high capacity contactor which will apply the power to the compressor selecting the proper shaft rotation sense (direction) for high capacity operation. As before (in mode 1), if the LOW capacity has been energized, the microcontroller will delay energizing the compressor in High capacity to allow the pressure to equalize. Notably, the HIGH capacity operation is the same for both mode 1 and 2 conditions.

Unifying these two modes of operation, if the microcontroller in the control detects a half wave rectified signal on both Y1_IN and Y2_IN (FIG. 3) or if the micro detects a full wave signal on only Y1_IN (FIG. 4) or only Y2_IN, then the compressor will be energized at LOW capacity. If the microcontroller detects a full wave signal at both Y1_IN and Y2_IN, then the compressor will be energized at HIGH capacity. Clearly, this allows the control to be used where only one control wire is available (which often occurs when the condenser unit of the refrigeration system is being replaced). And it can be used where two control wires are available to select between the two capacities of operation.

A control made as shown in FIGS. 1a–1d comprised the following components:
Generic 68HRC05J1A OTP (U1)
Printed Circuit Board (PCB)
1/4 Quick Connects (QC1, QC2, QC3, QC4, QC5, QC6, QC7, QC8, QC9, QC10, QC11, QC12)
5 AMP Fuse (F1)
Vert Fuse Terminal (FT1, FT2)
Resistors, 10K, 1/4W,1% (R1, R17)
0.022 Jumper, Non-insulated (J1)
IN4007 Diode (D1, D2, D3, D4, D5, D6)
Zener, 1N5231, 5%, 0.5W (Z1)
Zener, 1N5242, 5%, 0.5W (Z2, Z3, Z4, Z5)
ULN 2003A Relay Driver (U2)
22V P&B SPDT T7N Relay (K1, K2, K3)
Opto-Isolator (U3)
Resistors, 10K, 1/8W, 5% (R4, R5, R7, R8, R13, R14)
Resistors, 100K, 1/8W, 5% (R10, R 11, R16)
Resistors, 2K, 1/8W, 5% (R6, R15)
Resistors, 82K, 1/8W, 5% (R12)
Capacitors, 0.01uF, 50V (C6, C11, C12, C15)
Capacitors, 0.1uF, 50V (C7, C9)
Resistors, 1.5K, 2W, 5% (R9)
Resistors, 2K, 2W, 5% (R2, R3)
Standoffs—Metal Eyelet Newest (S1, S2, S3, S4)
Capacitors, 10uF, 16V ELECTL RAD CAPS (C2)
Capacitors, 47uF, 50V ELECTL RAD CAPS (C4)
Capacitors, 100uF, 50V ELECTL RAD CAPS (C10)
Radial LED, RED (LED1, LED2, LED3)
MOV for 24 VAC APPS (M1)
Capacitors, 0.1uF, 100V FILM CAP, 20% (C5, C8, C13, C14)

Obviously, features may be added to this control which employ the power of the microcontroller, such as adding fixed time delays between operations of the compressor. Another obvious feature would be to monitor the time that the LOW capacity was requested. If this time exceeds a given amount (e.g., 30 minutes) the control could infer that the LOW capacity of the compressor was not sufficient to cool the home, and the HIGH capacity could be energized. Numerous other variations and modifications of the invention will become readily apparent to those skilled in the art of HVAC controls. The invention should not be considered as limited to the specific embodiment depicted, but rather as defined in the claims.

What is claimed is:

1. In an HVAC system having a two stage control and relays, the control having a microcontroller having first and second two stage input signal terminals, a power supply from a transformer full wave rectified to create DC voltages for the microcontroller and relays, a two stage room thermostat having first and second stage output signal terminals, the method of using a single input line between the room thermostat and the control comprising the steps of shorting the first and second stage input signal terminals of the control together, taking a diode and connecting the diode between first and second stage output signal terminals of the room thermostat to create separate microcontroller recognizable signals.

2. A method according to claim 1 in which the HVAC system is a cooling system and the room thermostat has Y1 and Y2 two stage cooling signal terminals and the first and second stage output signal terminals of the room thermostat are the Y1 and Y2 terminals.

3. A method according to claim 2 in which the diode has an anode and a cathode, the anode is connected to one of the Y1 and Y2 terminals and the cathode is connected to the other of the Y1 and Y2 terminals, the control being insensitive to diode polarity.

4. A two stage HVAC system comprising a control having a microcontroller and relays, the microcontroller having first and second two stage input signal terminals, a power supply from a transformer rectified to create DC voltages for the microcontroller and relays, a two stage room thermostat having first and second stage output signal terminals and a diode connected between the first and second stage output signal terminals of the room thermostat to create separate microcontroller recognizable signals.

5. A two stage HVAC system according to claim 4 in which the first and second two stage input signal terminals are shorted together.

6. A two stage HVAC system according to claim 5 in which the HVAC system is a cooling system and the room thermostat has Y1 and Y2 two stage cooling signal terminals and the first and second stage output signal terminals of the room thermostat are the Y1 and Y2 terminals.

7. A two stage HVAC system according to claim 6 in which the diode has an anode and a cathode, the anode is connected to the Y1 terminal and the cathode is connected to the Y2 terminal, the control being insensitive to diode polarity.

* * * * *